United States Patent [19]
Mossini

[11] Patent Number: 5,110,077
[45] Date of Patent: May 5, 1992

[54] MEMBERS FOR SUPPORTING ARTICLES ON SMOOTH WALLS

[76] Inventor: Romano Mossini, Via Arzaga, 4, 20146 Milano, Italy

[21] Appl. No.: 490,574
[22] PCT Filed: Sep. 16, 1988
[86] PCT No.: PCT/IT88/00063
  § 371 Date: Feb. 28, 1990
  § 102(e) Date: Feb. 28, 1990
[87] PCT Pub. No.: WO89/02360
  PCT Pub. Date: Mar. 23, 1989

[30] Foreign Application Priority Data

Sep. 18, 1987 [IT] Italy ............................... 21954 A/87

[51] Int. Cl.⁵ ............................................ A47G 1/17
[52] U.S. Cl. ................................ 248/205.3; 248/683
[58] Field of Search ............... 248/205.3, 205.2, 683, 248/300, 309.1, 235

[56] References Cited

U.S. PATENT DOCUMENTS

| | | |
|---|---|---|
| 2,765,998 | 10/1956 | Engert . |
| 3,300,164 | 1/1967 | Welles . |
| 3,504,878 | 4/1970 | Dressler .......................... 248/205.3 |
| 4,039,134 | 8/1977 | Redmer ........................... 248/205.3 |
| 4,125,248 | 11/1978 | Liptak ......................... 248/205.3 X |
| 4,167,259 | 9/1979 | Bury ................................ 248/205.3 |
| 4,239,167 | 12/1980 | Lane ................................ 248/205.3 |
| 4,634,089 | 1/1987 | Wright et al. ............... 248/205.2 X |
| 4,653,711 | 3/1987 | Marshell ......................... 248/205.3 |
| 4,691,822 | 9/1987 | Malancon, Jr. ............. 248/205.3 X |
| 4,936,532 | 6/1990 | Williams .......................... 248/205.3 |
| 4,962,907 | 10/1990 | Gary ................................ 248/205.3 |

FOREIGN PATENT DOCUMENTS

| | | |
|---|---|---|
| 0176125 | 4/1986 | European Pat. Off. . |
| 3632819 | 3/1988 | Fed. Rep. of Germany . |
| 1471810 | 1/1967 | France . |
| 1497481 | 9/1967 | France . |
| 0554161 | 9/1974 | Switzerland . |

Primary Examiner—Ramon O. Ramirez
Attorney, Agent, or Firm—Young & Thompson

[57] ABSTRACT

A member for supporting articles on smooth walls is obtained by thermoforming of a plastic sheet. The member is comprised of a three-dimensional rigid central part which functions to support an object, and a flexible peripheral part, suitably covered with adhesive, which acts as a surface of contact, and therefore an anchorage, with the wall.

7 Claims, 2 Drawing Sheets

MEMBERS FOR SUPPORTING ARTICLES ON SMOOTH WALLS

FIELD OF THE INVENTION

This invention concerns a process for supporting objects with various uses, for example shelves, clothes hooks, containers, advertising objects, etc., to a smooth surface, for example the surface of a sheet of glass in a shop window or a domestic wall covered with smooth ceramic tiles, using a plastic sheet having an adhesive coating on one side. This same invention also concerns a manufactured article which is used in said process.

DESCRIPTION OF THE RELATED ART

In order to assure the adherence of an object to a smooth surface one generally has to use pressure adhesive (or self-adhesive). This solution, which is suitable for sticking a flexible plastic label to the glass of a window, is not suitable for anchoring a rigid, flat supporting base to the smooth surface of a wall.

At present in order to stick a rigid body—for example the base of a clothes hook—to a smooth surface one has to use a felt square (or a pad made of foamed plastic), covered with adhesive, which is placed between the wall and the resting surface of said body. However, the felt square covered with adhesive, apart from making the joint between the object and the wall cumbersome, has the inconvenience of providing an anchorage which is not always secure, since it can break off from the wall due to the considerable elastoplastic deformations.

Finally, it is superfluous to recall the difficulties of using suction cups.

U.S. Pat. No. 3,300,164 describes a support device for adhesive application to a surface comprising a thin walled flexible plastic sheet having an adhesive coating on one side and a support member, in particular a split ring, secured to the plastic sheet by a rivet. With this solution high stresses are induced in the contact area between the rivet and the plastic sheet, which stresses cause deformations of the plastic sheet and the breakaway of the rivet therefrom.

OBJECT OF THE INVENTION

The aim of the invention is therefore to provide the possibility of supporting, in a practical and secure way, any object, fixing it to smooth surfaces.

SUMMARY OF THE INVENTION

The above aim has been reached, according to the features recited in the appended claims, by providing a manufactured article obtained by thermoforming of a plastic sheet, appropriately shaped so as to have a three-dimensional, rigid central part apt to support an object and a flexible peripheral part, which will be covered with adhesive, for fixing to a wall.

Preferably, the rigid central part of the manufactured article is shaped so as to receive the object to be supported.

The rigidity of the central part can be obtained by molding the central part so as to acquire a three-dimensional shape. Possibly the rigidity can be increased by the addition or inclusion of other rigid elements.

The shape of this central part depends on its function, for instance a shelf supporting objects or a frame holding a mechanism.

The flexibility of the peripheral part of the manufactured article is obtained by adapting said part to the surface to which the object must be fixed, i.e. generally to a flat, or slightly convex or concave surface. The flexibility of the peripheral part is increased by providing a suitably small thickness. The thickness of this part must be small enough to provide flexibility, however not so small to invalid the rigidity of the central part and the mechanical resistance of the manufactured article.

In conformity with the invention, the peripheral part covered with adhesive can either be made of more separate parts which are not connected to each other, for example tongues, which jut out from the rigid part, or else can be a single continuous peripheral frame.

An adhesive means can be spread, or else a double-sided adhesive film, available on the market, can be applied to the peripheral part of the manufactured article replacing the pressure adhesive.

In conformity with the invention, the manufactured article is applied to a smooth wall in the desired position so as to stick to said wall by means of the adhesive covering the peripheral part, while the central rigid part houses and supports the object.

Objects can thus be fixed to a smooth wall without having to use felt squares or the like. The connection with the wall is then as a whole more rigid, more stable and less cumbersome than that of the solution with the felt square. The simple construction of the manufactured article bears an economic advantage.

Thus, small adhesive shelves, advertising objects, monitors, supporting mechanisms for the movement of movable parts, self-adhesive containers of various shapes and sizes, and other objects useful for shops, cars or the house can be easily carried out.

BRIEF DESCRIPTION OF THE DRAWINGS

The invention will now be clarified by means of non-restrictive embodiments, illustrated in the attached drawings, in which.

DESCRIPTION OF THE PREFERRED EMBODIMENTS

Figure 1:
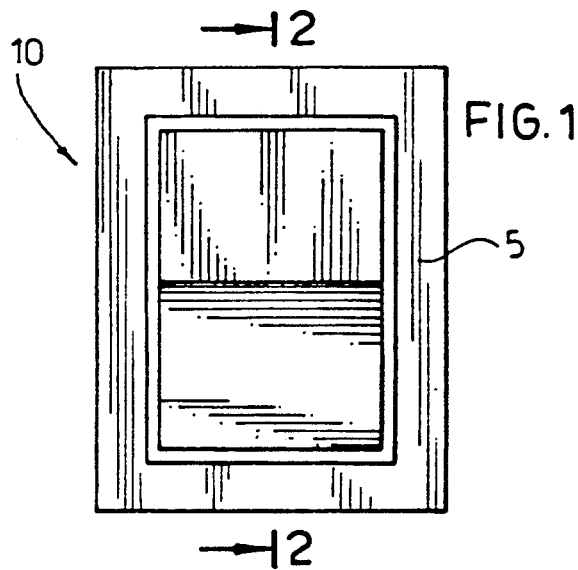
FIG. 1 shows a frontal view of a first example of a manufactured article capable of supporting an object fixing it to a smooth wall.
Figure 2:
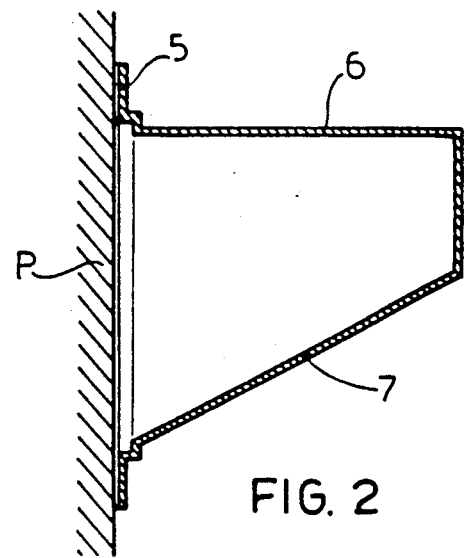
FIG. 2 shows a section along line 2—2 of FIG. 1.

In FIGS. 1 and 2, a self-adhesive shelf 10 is shown made by thermoforming a rigid plastic sheet, for example a polyvinyl chloride sheet, having a thickness, for example of 0.5 mm. In this manufactured article which is made of one piece, the pressure adhesive is inserted between the article and the wall P along the flat anchoring surface made from the peripheral part or frame 5 shown in FIG. 1. The thickness of the frame 5, after the thermoforming, is of 0.2 mm. The small thickness of this frame 5 guarantees the necessary flexibility so that said frame 5 can stick perfectly to the wall P without risk of breaking off. The central part of the manufactured article has been thermoformed into a three-dimensional shape having the functional characteristics of a shelf. It results rigid. In this central part, a resting plane 6, capable of supporting an object, and supporting sides 7 are visible.

Figure 3:
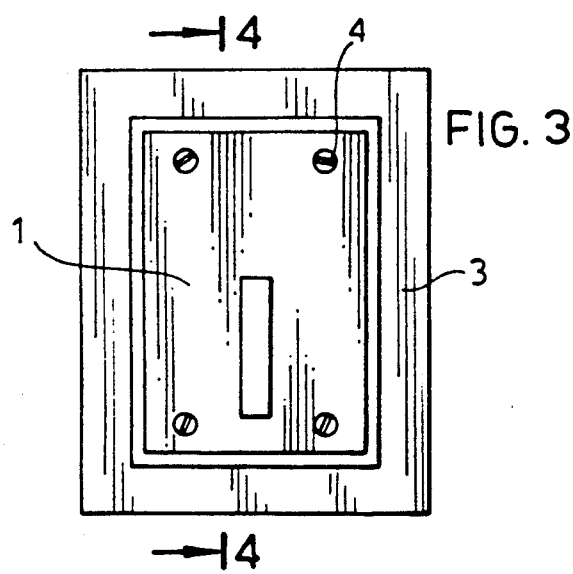
FIG. 3 shows a frontal view of a second example.
Figure 4:
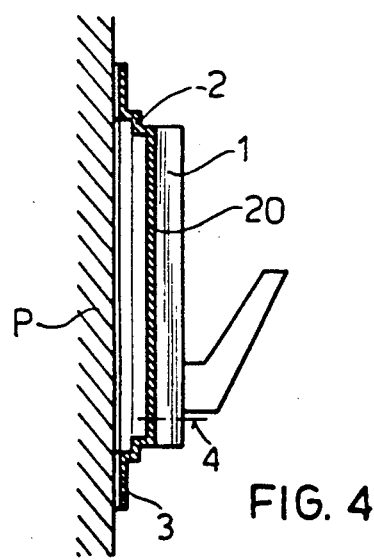
FIG. 4 shows a section along line 4—4 of FIG. 3.

In FIGS. 3 and 4, a hook 1 is shown having a one piece rigid plastic basement obtained by injection molding. The hook 1 is fastened with screws 4 to the central part 20 of a manufactured article 2 in a single piece carried out by thermoforming of a rigid sheet of PVC having a thickness for example of 0.4 mm. A pressure adhesive is interposed between the thermoformed manufactured article and the wall P according to the surface of contact made by the frame 3. The peripheral part, or frame 3, on which the adhesive is applied has thickness appropriately less than that of the central part which is next to the hook 1, for example a thickness of 0.3 mm. As can be seen from these figures the manufactured article 2, sticking by its frame 3 to the wall P, fixes without danger of the hook breaking off from said wall P.

Figure 5:
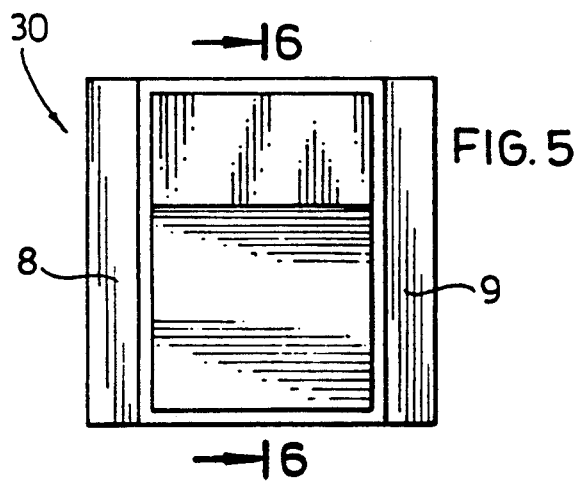
FIG. 5 shows a frontal view of a third example.
Figure 6:
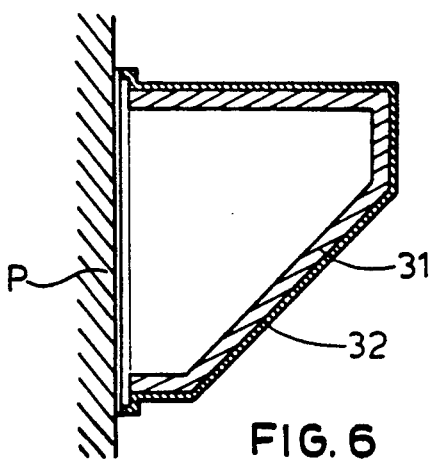
FIG. 6 shows a section along line 6—6 of FIG. 5.

In FIGS. 5 and 6, a self-adhesive shelf 30 is shown, the process of manufacture of which being similar to that of the shelf of FIGS. 1 and 2, but differs from this due to the fact that its anchoring surface is made of only two separate parts which have the appearance of two tongues 8 and 9 jutting out from the central body. As can be seen in FIG. 6, the central part 33 of the manufactured article receives a stiffening element 31. This element 31 can be fixed to the shelf 30 during the production or else it can be inserted afterwards.

The tongues 8 and 9 can also be provided so as to result inwardly turned. The pressure adhesive will be inserted between the tongues and the wall. This advantageous solution allows that the parts covered with adhesive are invisible because they are placed on the back of the rigid part of the manufactured article.

Figure 7:
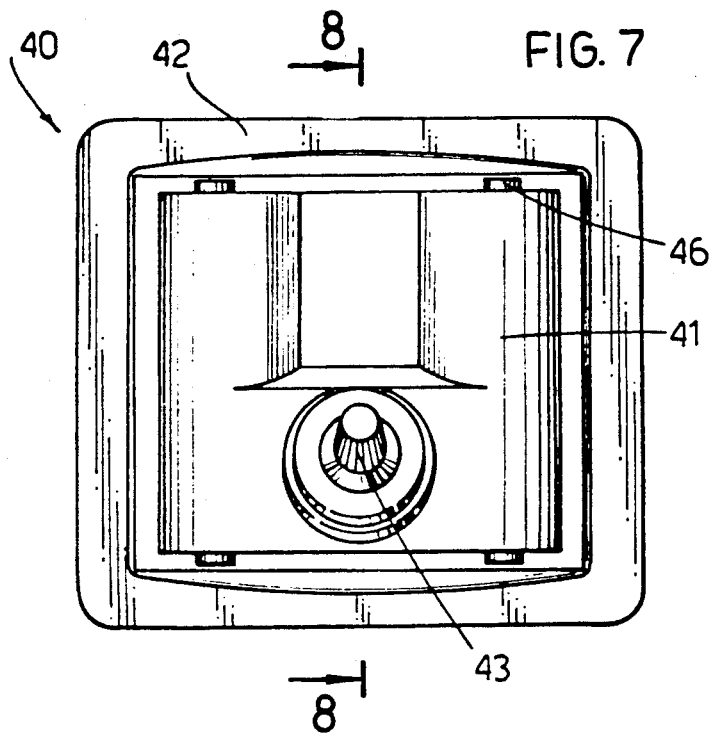
FIG. 7 shows a frontal view of a fourth example.
Figure 8:
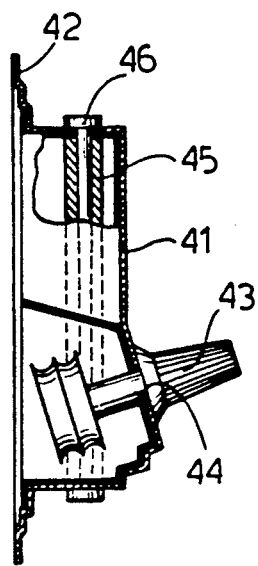
FIG. 8 shows a section along line 8—8 of FIG. 7.
Figure 9:
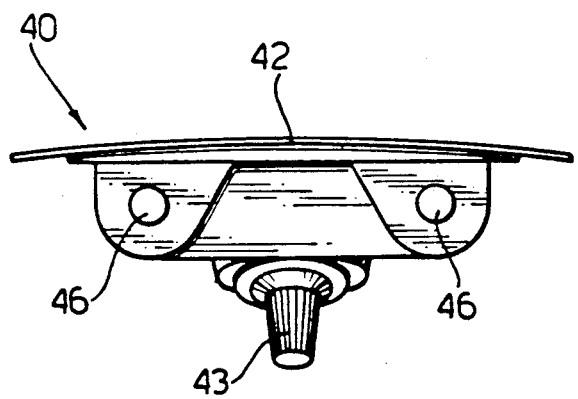
FIG. 9 shows a view from above with respect to FIG. 7.

Finally, in FIGS. 7, 8 and 9, a manufactured article 40 is shown, the central part 41 of which receives the mechanism, indicated on the whole with 45, of a device acting for example as a parking timer. This timer is fixed to the rigid central part 41 by pivots 46. The central part 41 of the manufactured article has an opening 44, through which the control handle 43 can be operated. The peripheral part 42 has a slightly convex shape, as can be seen in FIG. 9, in order to perfectly stick to the windshield of a vehicle.

I claim:

1. A member for supporting articles on smooth walls, the member comprising a single plastic sheet that has a single three-dimensional rigid central part that acts as an article support and a flexible peripheral flange, the rear surface of said flange being covered with adhesive and serving to anchor the member to a smooth wall, said rigid central part being hollow and having a front side, a top side, a bottom side, and two lateral sides, said top side integrally interconnecting the front and both lateral sides from above, said bottom side integrally interconnecting the front and both lateral sides from below.

2. A member as claimed in claim 1, in which said top side of said rigid central part has a flat upper surface which serves as a shelf.

3. A member as claimed in claim 1, in which said rigid central part carries a hook.

4. A member as claimed in claim 1, in which said flange extends entirely about said single rigid central part and the entire rear surface of said flange is covered with adhesive.

5. A member for supporting articles on smooth upright walls, the member comprising a single plastic sheet that has a three-dimensional rigid central part that acts as an article support and a flat flexible peripheral flange extending entirely about said rigid central part, the entire rear surface of said flange being covered with adhesive and serving to anchor the member to a smooth upright wall, said rigid central part being hollow and having a front side, a top side, a bottom side, and two lateral sides, said top side integrally interconnecting the front and both lateral sides from above, said bottom side integrally interconnected the front and both lateral sides from below.

6. A member as claimed in claim 5, in which said top side of said rigid central part has a flat upper surface which serves as a shelf.

7. A member as claimed in claim 5, in which said rigid central part carries a hook.

* * * * *